C. W. McKINLEY.
LUBRICATOR INDICATOR.
APPLICATION FILED DEC. 1, 1914.
1,151,029.
Patented Aug. 24, 1915.
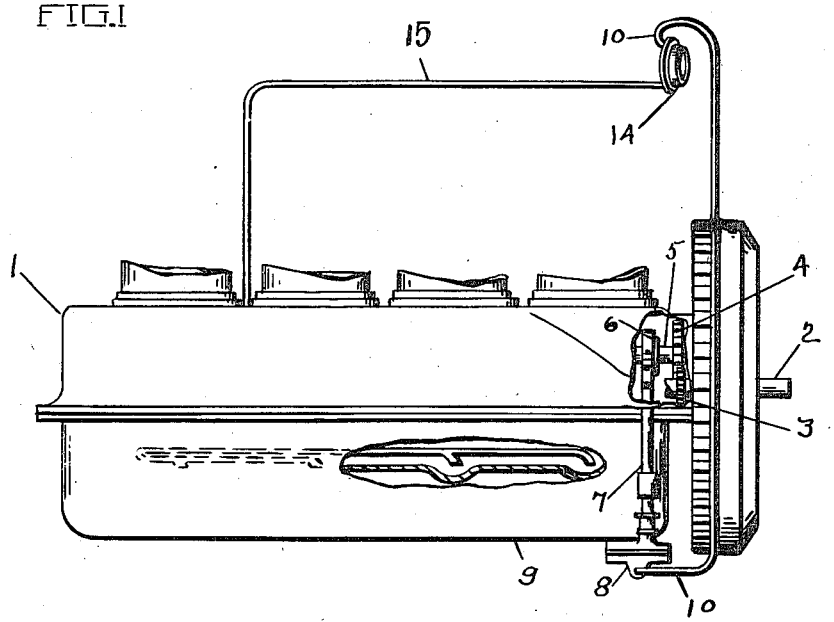
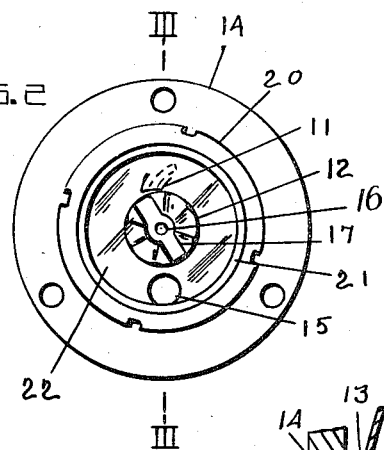
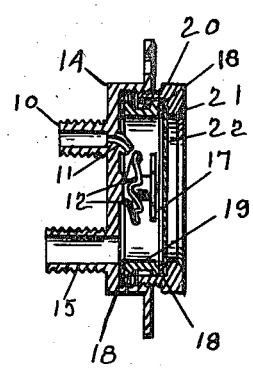
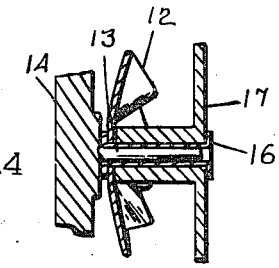
Witnesses
Gladys Jameson
C. H. Rauch
Inventor
Chas W McKinley
By Geo E Kirk
Attorney

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

LUBRICATOR-INDICATOR.

1,151,029.   Specification of Letters Patent.   Patented Aug. 24, 1915.

Application filed December 1, 1914. Serial No. 875,044.

*To all whom it may concern:*

Be it known that I, CHARLES W. MCKINLEY, a citizen of the United States, residing at Toledo, Lucas county, Ohio, have invented a new and useful Lubricator-Indicator, of which the following is a specification.

This invention relates to indicating means for determining the operation of a circulatory system.

This invention has utility when incorporated in an indicator for disclosing the supply or flow of lubricant, especially in flood lubrication systems as used in connection with internal combustion motors in motor vehicle practice, in which instances the device may be mounted at a convenient place for inspection by the driver of the vehicle.

Referring to the drawings: Figure 1 is a fragmentary view outlining the combination of the indicator device in connection with an internal combustion motor; Fig. 2 is an enlarged front view of the device which may be mounted, say on the dash panel of a motor vehicle; Fig. 3 is a section on the line III—III, Fig. 2; and Fig. 4 is an enlarged central section of the indicator turbine and its mounting.

The internal combustion motor 1 is provided with the shaft 2 driven thereby and carrying the gear 3 in mesh with the gear 4 on the shaft 5 driving the eccentric 6 effective to reciprocate the plunger 7 of the pump 8 supplied with lubricant from the reservoir or crank case 9 which in its circulatory system travel is forced by the pump 8 up through the pipe 10. This pipe or duct 10 terminates in a nozzle 11 directed to deliver the stream of oil against the buckets of the turbine wheel 12 loosely mounted on the bearing or stem 13 of the housing member 14. The spill or exhaust from this turbine is conducted away through the pipe 15 to lubricate the motor. The tubular rivet 16 on the stem 13 connects the turbine wheel 12 to the winged member 17 to be driven by the wheel 12. In the housing 14 are disposed the packing rings or gaskets 18, one on each side of the flanged ring 19, all held in position by the externally threaded nut 20 having a flange 21 inwardly projecting to engage the transparency or sight glass 22 of the indicator. The riveted portion or flange of the rivet 16 slightly spaces the winged wiper member 17 from the glass 22. By this construction the thin film of oil between the wiper 17 and the glass 22 does not interfere with clearing of the glass so that any inspection will reveal whether the wiper or vanes are rotating, while the resistance to rotation of the turbine is kept to a minimum.

In flood lubrication systems, the large volume of oil passing through the chamber of the housing 14 tends to bespatter the glass 22, or when a stoppage in the circulatory system leaves the housing chamber flooded, inspection would not disclose from the indicator the departure from regular circulation, which the wiper herein so plainly shows at all times.

What is claimed and it is desired to secure by Letters Patent is:

1. A flow indicator embodying a sight transparency, a wiper for the transparency, and a supporting bearing for the wiper on the side of the wiper away from the transparency.

2. A flow indicator embodying a transparency, a loosely mounted wiper for the transparency, and driving means for the wiper for thrusting the wiper toward the transparency.

3. A flow indicator embodying a transparency, a wiper for the transparency, and flow driving means for the wiper from the side of the wiper opposite the transparency holding the wiper toward the transparency.

4. A flow indicator embodying a transparency, and a wiper for the transparency movable theretoward and having film spacing therefrom.

5. A lubrication feed indicator embodying a visible radially corrugated flow actuated movable member.

6. A lubrication feed indicator embodying a flow passage having a nozzle, a transparency adjacent the nozzle, a bearing opposing the transparency, a turbine mounted on the bearing to be actuated by flow from the nozzle, and a wiper for the transparency, driven by the turbine.

7. A loosely mounted turbine, a supporting bearing for the turbine on one side thereof, a transparency disposed adjacent the other side of the turbine, and a supply nozzle for the turbine for actuating the turbine toward the transparency.

In testimony whereof I affix my signature in the presence of two witnesses.

CHARLES W. McKINLEY.

Witnesses:
C. H. RAUCH,
GEO. E. KIRK.